(12) United States Patent
Barrenscheen

(10) Patent No.: US 7,228,569 B2
(45) Date of Patent: Jun. 5, 2007

(54) PROGRAMMABLE UNIT

(75) Inventor: Jens Barrenscheen, München (DE)

(73) Assignee: Infineon Technologies AG, München (DE)

( * ) Notice: Subject to any disclaimer, the term of this patent is extended or adjusted under 35 U.S.C. 154(b) by 832 days.

(21) Appl. No.: 10/157,635

(22) Filed: May 29, 2002

(65) Prior Publication Data
US 2002/0184523 A1    Dec. 5, 2002

(30) Foreign Application Priority Data
May 29, 2001    (DE) ............................... 101 26 281

(51) Int. Cl.
G06F 12/00    (2006.01)
G06F 13/00    (2006.01)
G06F 13/28    (2006.01)

(52) U.S. Cl. ..................... 726/34; 711/152; 711/154; 711/163

(58) Field of Classification Search ................. 726/34, 726/35, 36
See application file for complete search history.

(56) References Cited

U.S. PATENT DOCUMENTS

| | | |
|---|---|---|
| 5,251,304 A | 10/1993 | Sibigtroth et al. |
| 5,557,743 A | 9/1996 | Pombo et al. |
| 5,721,877 A * | 2/1998 | Heflinger et al. ........... 711/163 |
| 5,737,760 A | 4/1998 | Grimmer, Jr. et al. |
| 5,826,007 A | 10/1998 | Sakaki et al. |

FOREIGN PATENT DOCUMENTS

| | | |
|---|---|---|
| DE | 198 47 677 A1 | 5/1999 |
| DE | 198 35 609 C2 | 2/2000 |
| DE | 100 55 118 A1 | 4/2001 |
| EP | 0 661 642 A2 | 7/1995 |
| EP | 0 694 828 A2 | 1/1996 |
| WO | 00/08558 | 2/2000 |

* cited by examiner

Primary Examiner—Gilberto Barrón, Jr.
Assistant Examiner—A. Nobahar
(74) Attorney, Agent, or Firm—Laurence A. Greenberg; Werner H. Stemer; Ralph E. Locher

(57) ABSTRACT

A programmable unit is described. The programmable unit has a memory device and a read protection device by which it is possible to prevent data from being read from the memory device. The described programmable unit is distinguished in that the read protection device prevents data from being read from the memory device only when a locking tag is set, and in that the programmable unit sets or does not set the locking tag automatically as a function of the operating mode that the programmable unit is in.

20 Claims, 1 Drawing Sheet

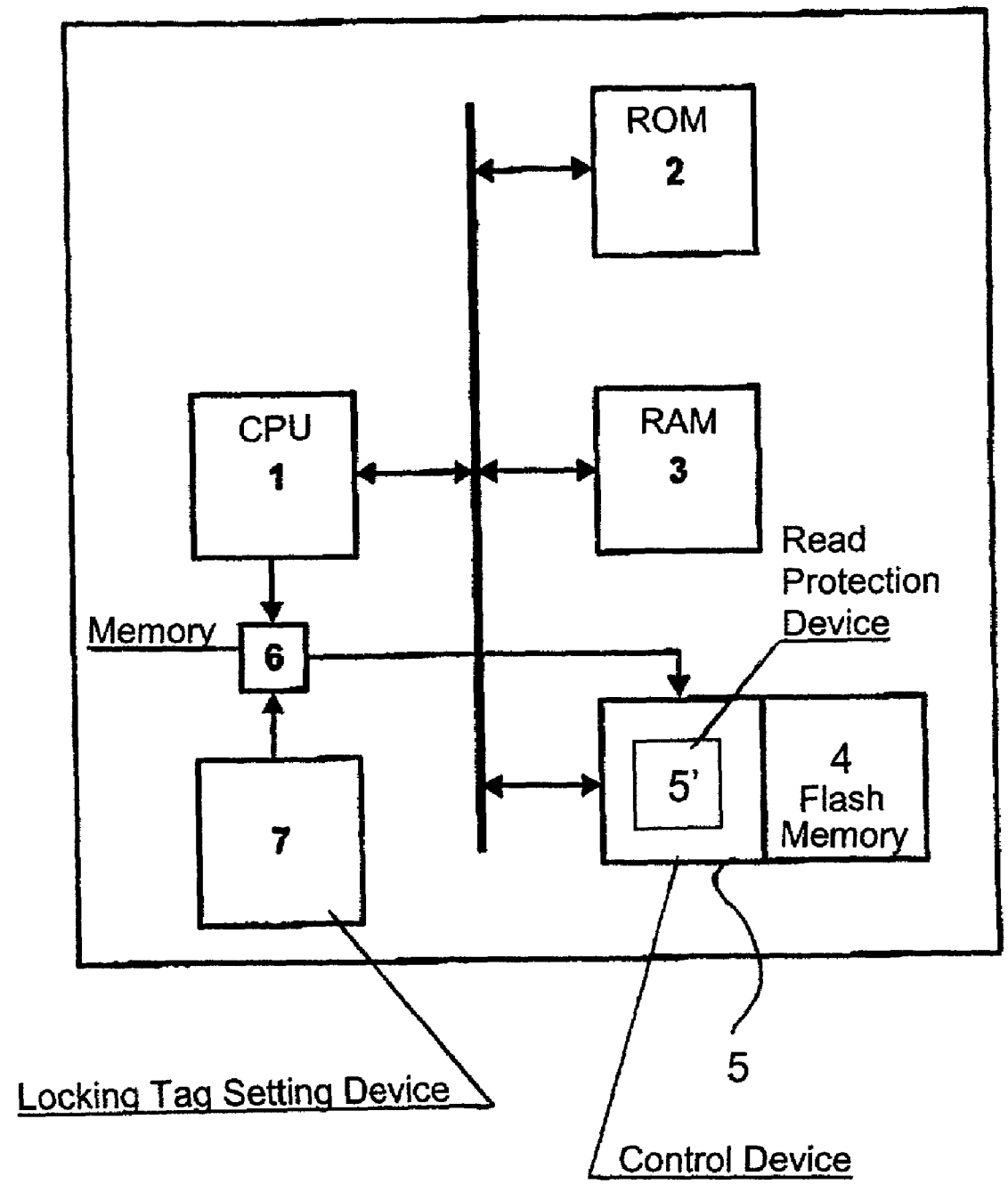

PROGRAMMABLE UNIT

BACKGROUND OF THE INVENTION

FIELD OF THE INVENTION

The present invention relates to a programmable unit having a memory device and a read protection device by which it is possible to prevent data from being read from the memory device.

Programmable units such as microprocessors, micro controllers, signal processors, etc. have been known in innumerable embodiments for many years and do not need to be explained in any more detail.

Programmable units having read protection devices are used when the aim is to prevent data or programs which are stored within the programmable unit from being read and being emitted from the programmable unit. This is necessary when the data or programs contain secret data or programs which—for whatever reason—should not or must not come into the possession of unauthorized persons.

The read protection devices understandably do not suppress all reading of data from the memory device to be protected, but are active only when the user of the programmable unit wishes to restrict the reading of the memory device to be protected, and when an event has occurred following which there is a risk of a hacker being able to read data from the memory device.

The first condition, that is to say whether or not the read protection should be activated when the second condition is satisfied, is set by the program that is carried out by the programmable unit, to be more precise by the execution of one or more specific commands.

The second condition, that is to say the monitoring for the occurrence of an event after which there is a risk of a hacker being able to read data from the memory device, is regarded as being satisfied when the programmable unit retrieves the commands to be executed by it from a memory device which is provided outside the programmable unit. The monitoring for the occurrence of this condition is carried out by checking the addresses from which the commands executed by the programmable unit are retrieved.

However, in this way, it is not reliably possible to prevent hackers from being able to read the contents of a memory device to be protected.

This is the case, for example, when the programmable unit executes a bootstrap loader after being switched on, by which data which represents commands is read to the programmable unit from a memory device provided outside the programmable unit, and the commands are carried out at a later time, to be more precise after the programmable unit has been reset by the bootstrap loader. This is because, when carrying out commands which have been loaded by the bootstrap loader into the programmable unit, the commands are obtained from a memory device which is provided within the programmable unit so that, although these commands originate from outside the programmable unit in the final analysis, and can be manipulated by a hacker, the second condition mentioned above is not regarded as being satisfied. Therefore, a hacker can use the program loaded into the programmable unit by the bootstrap loader to read the memory that is to be protected against unauthorized access.

The memory that is to be protected against unauthorized access can also be read if the programmable unit has an on chip debug support (OCDS) module which is able to cause commands to be executed (for example commands to be injected into the instruction queue). In this case as well, commands that originate from outside the programmable unit can be executed without the second condition mentioned above being regarded as being satisfied.

SUMMARY OF THE INVENTION

It is accordingly an object of the invention to provide a programmable unit which overcomes the above-mentioned disadvantages of the prior art devices of this general type, in which persons who are not authorized to do so can reliably be prevented from reading a memory device in all circumstances.

With the foregoing and other objects in view there is provided, in accordance with the invention, a programmable unit containing a memory device and a read protection device connected to the memory device. The read protection device prevents data from being read from the memory device only when a locking tag is set. The programmable unit sets or does not set the locking tag automatically in dependence on an operating mode of the programmable unit.

The programmable unit according to the invention is distinguished in that the read protection device prevents data from being read from the memory device only when a locking tag is set, and in that the programmable unit sets or does not set the locking tag automatically as a function of the operating mode that the programmable unit is in.

Since the locking tag is no longer set as a function of the address from which the programmable unit retrieves the respective commands to be carried out, but as a function of the operating mode that the programmable unit is in, it is possible to prevent data being read from the memory device to be protected even in phases which the known read protection devices cannot identify as being critical.

The memory device to be protected can thus be protected more reliably, and even more easily, against unauthorized reading.

In accordance with an added feature of the invention, the memory device whose reading can be prevented by the read protection device is a nonvolatile memory.

In accordance with an additional feature of the invention, the programmable unit ensures that the locking tag is set when the programmable unit is the operating mode in which it is impossible to prevent the programmable unit executing commands which are loaded into the programmable unit from outside the programmable unit. The programmable unit ensures that the locking tag is set when the programmable unit is in the operating mode in which the programmable unit transfers an application program to be carried out by the programmable, or a part of the application program, using a bootstrap loader from outside the programmable unit into an internal program memory in the programmable unit, and carries this out at a later time. The programmable unit ensures that the locking tag is set when the programmable unit is in the operating mode in which the programmable unit loads commands to be carried out by the programmable unit from a memory device that is provided outside the programmable unit. The programmable unit ensures that the locking tag is set when the programmable unit is in the operating mode in which the programmable unit carries out test routines, by which the programmable unit is tested.

In accordance with another feature of the invention, a central processing unit is connected to the read protection device. The programming unit has devices which when activated are hierarchically superior to the central processing unit. The programmable unit ensures that the locking tag is set when the programmable unit is in the operating mode in that the devices in the programmable unit are activated which are hierarchically superior to the CPU and can influence states within the programmable unit and processes which are taking place.

In accordance with a further feature of the invention, a nonvolatile memory is provided, and a content of the locking tag is changed by a startup program that is stored in the nonvolatile memory and is carried out before an application program is carried out.

In accordance with another added feature of the invention, a locking tag setting device is provided and has logic for changing a content of the locking tag. The locking tag setting device is coupled to the read protection device.

In accordance with another additional feature of the invention, input connections and output connections are provided. The locking tag is set or is not set in dependence on a state of the input connections and/o the output connections. The input connections and the output connections are connections through which the operating mode can be set.

In accordance with another further feature of the invention, the locking tag can be set by an appropriate command in an application program. The locking tag is not set when the programmable unit is switched on. Alternatively, the locking tag can be reset only by switching off or resetting the programmable unit.

In accordance with a further added feature of the invention, the read protection device prevents data from being read from the memory device only when a read protection tag is also set in addition to the locking tag. The read protection tag is set or reset by commands in an application program. A content of the read protection tag is changed only when an authorization for this is verified. The authorization can be verified by transmitting a specific code word.

In accordance with a further additional feature of the invention, the memory device is a nonvolatile memory, and the content of the read protection tag is changed only when the specific code word transmitted matches a code word stored in the nonvolatile memory. The read protection tag is set automatically after startup or after resetting of the programmable unit, if the read protection tag has already previously been set. The locking tag is set only when the read protection tag is set.

In accordance with another feature of the invention, if an attempt is made to read data from the memory device to be protected when a read protection is activated, specific other data is emitted rather than requested data.

In accordance with a concomitant feature of the invention, if an attempt is made to read data from the memory device to be protected when a read protection is activated, an error message or fault message is emitted.

Other features which are considered as characteristic for the invention are set forth in the appended claims.

Although the invention is illustrated and described herein as embodied in a programmable unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a block diagram of a programmable unit according to the invention.

DESCRIPTION OF THE PREFERRED EMBODIMENTS

Referring now to the single FIGURE of the drawing in detail, there is shown a programmable unit that is described in the following text as a microcontroller. However, it should be mentioned at this point that the special features described in the following text may also be used for other programmable units, for example for micro processors or signal processors.

The microcontroller under consideration here is configured as shown in the FIGURE. For the sake of completeness, it should be mentioned that only those components of the microcontroller that are of particular interest for the present purpose are illustrated and will be described.

The microcontroller shown in the FIGURE contains a CPU 1, a ROM 2, a RAM 3, a flash memory 4, a flash memory control device 5 connected upstream of the flash memory 4, a locking tag memory device 6, and a locking tag setting device 7.

The memory whose reading by unauthorized persons is intended to be prevented is the flash memory 4. However, it could also be any other nonvolatile or volatile memory for the programmable unit.

A read protection device 5' by which unauthorized reading of the flash memory 4 is prevented is, in the example under consideration, a component of the flash memory control device 5, but in principle could also be accommodated in any other component of the microcontroller.

As will be described later in more detail, the read protection device 5' operates as a function of a read protection tag that is stored in the flash memory control device 5, and of a locking tag which is stored in the locking tag memory device 6. As will likewise be described in more detail later, the read protection tag is set and reset by the user of the programmable unit (by the application program). The locking tag is set or not set automatically by the programmable unit as a function of the operating mode which the programmable unit is in, and the reading of the flash memory 4 is prevented when both the read protection tag and the locking tag are set.

In the example under consideration, in addition to the read protection device 5', the flash memory control device 5 also contains a write protection device, which prevents unauthorized writing to the flash memory 4. This is intended to prevent a hacker from being able to modify the programs or data stored in the flash memory 4. However, for the sake of completeness, it should be mentioned that the presence of the write protection device is not a precondition for the provision of the read protection device 5'. In certain cases, there may even be no need whatsoever for a write protection device. This is the case, for example, when the memory to be protected is a ROM.

A number of code words are also stored in the flash memory 4, in addition to the (application) programs and/or data which are/is actually to be stored, that is to say (application) programs and/or data which are/is also required for the intended application of the programmable unit.

In the example under consideration, the code words include:

a) a code word which is referred to as a first read protection code word in the following text and which, when input, sets the read protection tag;

b) a code word which is referred to as a second read protection code word in the following text and which, when input, resets the read protection tag; and c) a code word which is referred to as a write protection code word in the following text and which must be entered in order to allow data to be written to the flash memory 4.

In the example under consideration, the code words are entered by the user when the programmable unit is first started up, and are stored in the flash memory 4. In the example under consideration, this is done by a program or a program part that is stored in a nonvolatile memory in the programmable unit and which is executed when the programmable unit is first started up. The relevant program or the relevant program part may, however, also be stored in a memory provided outside the programmable unit (and loaded and executed by a bootstrap loader, for example).

The code words need not be stored in the flash memory 4; they may also be stored in any other nonvolatile memory device for the programmable unit. Irrespective of where the code words are stored, it should not be possible for them to be output from the programmable unit, or in any case not in response to an action by unauthorized persons.

The write protection code word is required by the write protection apparatus in order to check whether data supplied to the flash memory 4 or to the flash memory control device 5 may be written to the flash memory 4. To allow data that is supplied to the flash memory 4 or to the flash memory control device 5 to be written to the flash memory 4, the flash memory control device 5 must previously have been supplied with the write protection code word. The flash memory control device 5 compares the write protection code word supplied to it with the write protection code word stored in the flash memory 4 and allows the flash memory 4 to be written to or to be reprogrammed only when the code words that have been compared with one another match. In the example under consideration, the write protection is always active, and must be canceled for each write process.

As has already been mentioned above, the read protection code words are required to allow the content of the read protection tag to be changed. In order to set or to reset the read protection tag, the flash memory control device 5 must be supplied with the first and/or the second read protection code word. The flash memory control device 5 compares the code word supplied to it with the read protection code words stored in the flash memory 4. If a match is found in the process, the flash memory control device sets the read protection tag to the desired value.

The read protection code word is supplied by the program being carried out by the programmable unit. The user of the programmable unit can thus activate or deactivate the read protection.

The read protection tag has the special feature that it is reset automatically whenever the programmable unit is reset, at least once it has already previously been set. That is to say, the resetting of the read protection tag is only a temporary resetting process, which remains effective only until the programmable unit is switched off or reset.

However, the setting of a read protection tag is not in itself sufficient to prevent the flash memory 4 from being read. The locking tag that is stored in the locking tag memory device 6 must also be set for this purpose.

The locking tag is set automatically when specific conditions exist or occur, or in response to the application program which is being carried out by the programmable unit.

The conditions that result in the locking tag being set automatically are that the programmable unit is in a specific operating mode, or the programmable unit changes to a specific operating mode.

When the locking tag is set automatically, the locking tag is in some cases set only when the read protection tag is also set. However, of course, it is also possible for the locking tag always to be set independently or always to be set as a function of the state of the read protection tag.

The specific operating modes of the programmable unit mentioned above are those operating modes in which it is possible for the programmable unit to carry out commands obtained from outside the programmable unit. In this case, however, it is irrelevant whether the programmable unit actually carries out commands obtained from outside the programmable unit.

In the example under consideration, the programmable unit is in one of five different operating modes once it has been started up. These five operating modes are:

a) a normal start mode;

b) a bootstrap loader start mode;

c) an external start mode;

d) an unconfigured start mode; and e) a test mode.

The operating mode of the programmable unit once it has been started up is governed by the external circuitry of specific input and/or output connections (pins) of the programmable unit.

In the example under consideration, the programmable unit contains logic that uses a check of the pins that determine the operating mode to decide whether the programmable unit should start in the unconfigured start mode or in one of the other operating modes. The logic is the locking tag setting device 7. If the locking tag setting device 7 finds that the programmable unit should be started in the unconfigured start mode, it sets the locking tag and starts the (external) application program.

If the programmable unit is intended to be started in one of the other operating modes (not in the unconfigured start mode), the starting process is carried out using the execution of a program which is stored in an internal memory, preferably a program which is stored in the internal ROM 2, and is referred to in the following text as a startup program. The startup program checks the pins which determine the operating mode to determine in which of the other operating modes the programmable unit is intended to be started, sets the locking tag if the conditions to be satisfied for this purpose are satisfied, and initiates the execution of the application program.

In the example under consideration, the startup program also has further tasks, for example the starting and/or setting of the PLLs and charge pumps that are present. However, since this is not important to the read protection described here, it will not be described in any more detail.

All the tasks that the startup program carries out can also be carried out by appropriate hardware logic (a state machine).

In the normal start mode mentioned above, the application program to be carried out by the programmable unit is located in a nonvolatile memory provided within the programmable unit. In this operating mode, it is impossible for a hacker to introduce commands into the programmable unit, by which the memory to be protected can be read. The startup program therefore does not set the locking tag.

In the bootstrap loader start mode, a bootstrap loader is started once the startup program has been carried out (by the startup program). The bootstrap loader loads data representing commands from outside the programmable unit into the RAM 3 in the programmable unit, and once these commands have been loaded, causes them to be executed. Since commands that originate from outside the programmable unit are executed in this operating mode, the startup program sets the locking tag, provided the read protection tag is also set. For the sake of completeness, it should be mentioned that the bootstrap loader start mode can be used to reprogram the flash memory 4 for a programmable unit which has already been installed in a system. The program that the bootstrap loader loads into the programmable unit then contains the commands that are used to reprogram the flash memory 4 in accordance with the wishes of the system user. However, the reprogramming can be carried out only by someone who is authorized to do so by the manufacturer of the system. Only a person such as this knows the write protection code word that must be supplied to the flash memory 4 (to the flash memory control apparatus 5 which is connected upstream of the flash memory 4) for reprogramming the flash memory 4 to be possible. An authorized person can also read data from the flash memory 4 by the program loaded by the bootstrap loader. Although the read protection is active when both the read protection tag and the locking tag are set, the read protection tag and hence also the read protection may, however, be reset by one or more commands that are used to supply the read protection code word to the flash memory 4 (to the flash memory control apparatus 5 which is connected upstream of the flash memory 4). Since hackers do not know the read protection code word, they are not able to do this.

In the external start mode, the application program to be executed by the programmable unit is located in a memory that is provided outside the programmable unit. In this operating mode, the application program commands to be executed by the programmable unit are obtained from the external memory. Since commands that originate from outside the programmable unit are executed in this operating mode, the startup program that is carried out before the application program sets the locking tag provided the read protection tag is also set. Both the read protection and the write protection are thus active, so that a hacker has no chance of reading or reprogramming the flash memory 4.

In the unconfigured start mode, the application program to be executed by the programmable unit is likewise located in a memory that is provided outside the programmable unit. In this operating mode, the execution of the external application program starts immediately, without previously carrying out the startup program. Since commands that originate from outside the programmable unit are executed in this operating mode, the locking tag setting device 7 (which confirms that the programmable unit is in this operating mode) sets the locking tag. In this case, it is irrelevant whether the read protection tag is or is not set. If the read protection tag is set, both the read protection and the write protection are active, so that a hacker also has no chance to read or reprogram the flash memory 4 in this operating mode.

In the test mode, in which (as the title itself indicates) the programmable unit and/or the system containing it are/is being tested, the locking tag is set by the startup program. If the read protection tag is set, both the read protection and the write protection are active, so that a hacker also has no chance to read or reprogram the flash memory 4 in this operating mode.

The locking tag can be reset only by resetting the programmable unit, or by switching it off and on.

If a read access is made to the flash memory 4, the flash memory control device 5 checks the state of the read protection tag and of the locking tag, and allows data to be read from the flash memory 4 provided the read protection tag and/or the locking tag are/is not set, or prevents data being read from the flash memory 4 if both the read protection tag and the locking tag are set.

If the reading of data from the flash memory 4 is allowed (when the read protection is not activated), the flash memory control device 5 passes the address supplied to it to the flash memory 4, which then emits the data stored at this address.

If the reading of data from the flash memory 4 is inhibited (when the read protection is activated), the data requested from the flash memory 4 is not emitted. Instead of this, specific other data is emitted and/or an error message or fault message (for example a trap) is emitted.

The content of the read protection tag and/or of the locking tag can also be used to determine whether an on chip debug support (OCDS) module that is contained in the programmable unit may or may not be used. In order to prevent the flash memory 4 from being read by commands which originate from the OCDS module it is possible, for example, to provide for the OCDS module to be in the inactive state when the programmable unit is started up, and to have to be activated by the startup program or by the application program in order to make it possible to use it, with automatic activation by the startup program being made dependent, for example, on the content of the read protection tag, and with the locking tag being set when the OCDS module is activated (irrespective of the way in which it is activated).

A corresponding situation applies to the case where the programmable unit contains other devices, which are hierarchically superior to the CPU and can influence the states within the programmable unit and processes that are taking place.

With the described programmable unit, there is no longer any need to check the addresses from which commands and/or operands are obtained and make it dependent on the result of this check whether the read protection is or is not to be activated. Nevertheless, however, such a check may be carried out despite this, and the result of the check may be used as an additional condition or instead of some other condition for the setting and/or resetting of the read protection tag and/or of the locking tag and/or of some other tag on which the activation or deactivation of the read protection depends.

The described programmable unit may be modified in many ways.

For example, it is possible for the read protection and/or the write protection to be activated and deactivated by code word sequences rather than by a single code word.

Furthermore, it is possible to provide not only one locking tag but a number of locking tags, for example:

a) a locking tag which is set when commands which originate from outside the programmable unit are carried out or may be carried out; and b) a locking tag which is set when operands which originate from outside the programmable unit are used or may be used;

c) a locking tag which is taken into account when commands are intended to be read from the memory to be protected; and/or d) a locking tag which is taken into account when operands are intended to be read from the memory to be protected.

Irrespective of the details of the practical implementation, the described programmable unit makes it possible to reliably prevent, in a simple manner and in all circumstances, persons who are not authorized to do so from reading further memories contained in the programmable unit.

I claim:

1. A programmable unit, comprising:
   a memory device;
   a read protection device connected to said memory device;
   a memory control device for setting and storing a read protection tag;
   a locking tag memory device for storing a locking tag;
   a locking tag setting device having logic for changing a content of the locking tag, said locking tag setting device being coupled to said read protection device;
   said read protection device preventing data from being read from said memory device only when both the read protection tag and the locking tag are set, the read protection tag being set or reset by commands in an application program, and the locking tag being set or not set automatically by the programmable unit in dependence on an operating mode of the programmable unit.

2. The programmable unit according to claim 1, wherein said memory device is a nonvolatile memory.

3. The programmable unit according to claim 1, wherein the programmable unit ensures that the locking tag is set when the programmable unit is in the operating mode in which it is impossible to prevent the programmable unit executing commands which are loaded into the programmable unit from outside the programmable unit.

4. The programmable unit according to claim 3, wherein the programmable unit ensures that the locking tag is set when the programmable unit is in the operating mode in which the programmable unit transfers an application program to be carried out by the programmable unit, or a part of the application program, using a bootstrap loader from outside the programmable unit into an internal program memory in the programmable unit, and carries this out at a later time.

5. The programmable unit according to claim 3, wherein the programmable unit ensures that the locking tag is set when the programmable unit is in the operating mode in which the programmable unit loads commands to be carried out by the programmable unit from a memory device which is provided outside the programmable unit.

6. The programmable unit according to claim 3, wherein the programmable unit ensures that the locking tag is set when the programmable unit is in the operating mode in which the programmable unit carries out test routines, by which the programmable unit is tested.

7. The programmable unit according to claim 3,
   further comprising a central processing unit connected to said read protection device;
   further comprising devices which when activated are hierarchically superior to said central processing unit; and
   wherein the programmable unit ensures that the locking tag is set when the programmable unit is in the operating mode in which said devices in the programmable unit are activated which are hierarchically superior to said CPU and can influence states within the programmable unit and processes which are taking place.

8. The programmable unit according to claim 1, further comprising a nonvolatile memory, a content of the locking tag is changed by a startup program which is stored in said nonvolatile memory and is carried out before an application program is carried out.

9. The programmable unit according to claim 1, further comprising input connections and output connections, the locking tag being set or not set in dependence on a state of at least one of said input connections and said output connections.

10. The programmable unit according to claim 9, wherein said input connections and said output connections are connections through which the operating mode can be set.

11. The programmable unit according to claim 1, wherein the locking tag can be set by an appropriate command in an application program.

12. The programmable unit according to claim 1, wherein the locking tag is not set when the programmable unit is switched on.

13. The programmable unit according to claim 1, wherein the locking tag can be reset only by switching off or resetting the programmable unit.

14. The programmable unit according to claim 1, wherein a content of the read protection tag is changed only when an authorization for this is verified.

15. The programmable unit according to claim 14, wherein the authorization can be verified by transmitting a specific code word.

16. The programmable unit according to claim 15, wherein said memory device is a nonvolatile memory, and the content of the read protection tag is changed only when the specific code word transmitted matches a code word stored in said nonvolatile memory.

17. The programmable unit according to claim 1, wherein the read protection tag is set automatically after startup or after resetting of the programmable unit, if the read protection tag has already previously been set.

18. The programmable unit according to claim 1, wherein the locking tag is set only when the read protection tag is set.

19. The programmable unit according to claim 1, wherein if an attempt is made to read data from said memory device to be protected when a read protection is activated, specific other data is emitted rather than requested data.

20. The programmable unit according to claim 1, wherein if an attempt is made to read data from said memory device to be protected when a read protection is activated, an error message or fault message is emitted.

* * * * *